(12) United States Patent
Artz, Jr. et al.

(10) Patent No.: US 8,073,927 B2
(45) Date of Patent: *Dec. 6, 2011

(54) SYSTEM AND METHOD OF ASSOCIATING EVENTS WITH REQUESTS

(75) Inventors: John Curtis Artz, Jr., Woburn, MA (US); Heeren Pathak, Woburn, MA (US)

(73) Assignee: Vignette Software LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/545,412

(22) Filed: Aug. 21, 2009

(65) Prior Publication Data

US 2010/0049791 A1 Feb. 25, 2010

Related U.S. Application Data

(63) Continuation of application No. 10/616,107, filed on Jul. 9, 2003, now Pat. No. 7,603,430.

(60) Provisional application No. 60/394,620, filed on Jul. 9, 2002.

(51) Int. Cl.
*G06F 15/16* (2006.01)

(52) U.S. Cl. ........ 709/217; 709/203; 709/219; 709/223; 707/999.01

(58) Field of Classification Search .................. 709/203, 709/217, 219, 223; 705/26; 707/999.01
See application file for complete search history.

(56) References Cited

U.S. PATENT DOCUMENTS

| | | |
|---|---|---|
| 5,412,801 A | 5/1995 | de Remer et al. |
| 5,557,717 A | 9/1996 | Wayner |
| 5,668,801 A | 9/1997 | Grunenfelder |
| 5,732,218 A | 3/1998 | Bland et al. |
| 5,796,952 A | 8/1998 | Davis et al. |
| 5,837,899 A | 11/1998 | Dickerman et al. |
| 6,014,706 A | 1/2000 | Cannon et al. |
| 6,014,707 A | 1/2000 | Miller et al. |
| 6,041,335 A | 3/2000 | Merritt et al. |
| 6,078,956 A * | 6/2000 | Bryant et al. ................. 709/224 |
| 6,112,186 A | 8/2000 | Bergh et al. |
| 6,119,103 A | 9/2000 | Basch et al. |
| 6,128,663 A | 10/2000 | Thomas |
| 6,138,156 A | 10/2000 | Fletcher et al. |
| 6,144,962 A | 11/2000 | Weinberg et al. |
| 6,205,472 B1 | 3/2001 | Gilmour |
| 6,286,043 B1 | 9/2001 | Cuomo et al. |
| 6,321,206 B1 | 11/2001 | Honarvar |
| 6,393,479 B1 | 5/2002 | Glommen et al. |
| 6,430,539 B1 | 8/2002 | Lazarus et al. |

(Continued)

OTHER PUBLICATIONS

XSL Transformations (XSLT) Version 1.0, W3C Recommendation, www.w3.org/TR/1999/REC-xslt-19991116, pp. 1-87, Nov. 16, 1999.

(Continued)

*Primary Examiner* — Oanh Duong
(74) *Attorney, Agent, or Firm* — Sprinkle IP Law Group

(57) ABSTRACT

Management software that can associate events, including non page events, such as the generation of dynamic content, with HTTP requests. The management software can receive a set of HTTP request data including a request time stamp for each HTTP request in a set of HTTP requests, receive a set of event data including an event time stamp for each event in a set of events and associate each event from the set of events with a previous HTTP request from the set of HTTP requests based on the event time stamps and request time stamps. Each event can be associated with previous HTTP request closest in time.

20 Claims, 5 Drawing Sheets

U.S. PATENT DOCUMENTS

| | | | |
|---|---|---|---|
| 6,453,336 B1 | 9/2002 | Beyda et al. | |
| 6,456,305 B1 | 9/2002 | Qureshi et al. | |
| 6,496,824 B1 | 12/2002 | Wilf | |
| 6,509,898 B2 | 1/2003 | Chi et al. | |
| 6,559,882 B1 | 5/2003 | Kerchner | |
| 6,606,657 B1 | 8/2003 | Zilberstein et al. | |
| 6,629,136 B1 | 9/2003 | Naidoo | |
| 6,640,215 B1 | 10/2003 | Galperin et al. | |
| 6,732,331 B1 | 5/2004 | Alexander | |
| 6,757,740 B1 | 6/2004 | Parekh et al. | |
| 6,785,769 B1 | 8/2004 | Jacobs et al. | |
| 6,836,773 B2 | 12/2004 | Tamayo et al. | |
| 6,839,682 B1 | 1/2005 | Blume et al. | |
| 6,873,984 B1 | 3/2005 | Campos et al. | |
| 6,877,007 B1* | 4/2005 | Hentzel et al. | 709/224 |
| 6,892,238 B2 | 5/2005 | Lee et al. | |
| 6,966,034 B2 | 11/2005 | Narin | |
| 6,968,385 B1 | 11/2005 | Gilbert | |
| 6,996,536 B1 | 2/2006 | Cofino et al. | |
| 7,032,017 B2 | 4/2006 | Chow et al. | |
| 7,260,551 B2 | 8/2007 | Phillips | |
| 7,401,066 B2 | 7/2008 | Beinglass et al. | |
| 7,441,195 B2 | 10/2008 | Error et al. | |
| 7,461,120 B1 | 12/2008 | Artz et al. | |
| 7,502,994 B2 | 3/2009 | Kocolm | |
| 7,542,918 B2 | 6/2009 | Phillips | |
| 7,603,430 B1* | 10/2009 | Artz et al. | 709/217 |
| 7,680,672 B2 | 3/2010 | Olsson et al. | |
| 7,792,844 B2 | 9/2010 | Error et al. | |
| 7,895,355 B2 | 2/2011 | Artz et al. | |
| 2001/0037321 A1 | 11/2001 | Fishman et al. | |
| 2002/0029275 A1 | 3/2002 | Selgas | |
| 2002/0057675 A1 | 5/2002 | Park | |
| 2002/0062223 A1 | 5/2002 | Waugh | |
| 2002/0091755 A1 | 7/2002 | Narin | |
| 2002/0095322 A1 | 7/2002 | Zarefoss | |
| 2002/0107841 A1 | 8/2002 | Hellerstein et al. | |
| 2002/0112082 A1 | 8/2002 | Ko et al. | |
| 2002/0128925 A1* | 9/2002 | Angeles | 705/26 |
| 2002/0129381 A1 | 9/2002 | Barone et al. | |
| 2002/0143925 A1 | 10/2002 | Pricer et al. | |
| 2002/0161673 A1 | 10/2002 | Lee et al. | |
| 2002/0178169 A1 | 11/2002 | Nair et al. | |
| 2002/0193114 A1 | 12/2002 | Agrawal et al. | |
| 2003/0018827 A1* | 1/2003 | Guthrie et al. | 709/318 |
| 2003/0088716 A1 | 5/2003 | Sanders | |
| 2003/0154184 A1 | 8/2003 | Chee et al. | |
| 2003/0190649 A1 | 10/2003 | Aerts et al. | |
| 2003/0202509 A1 | 10/2003 | Miyano et al. | |
| 2003/0212594 A1 | 11/2003 | Hogan | |
| 2003/0236892 A1 | 12/2003 | Coulombe | |
| 2004/0205489 A1 | 10/2004 | Bogat | |
| 2004/0215599 A1 | 10/2004 | Apps et al. | |
| 2005/0102292 A1 | 5/2005 | Tamayo et al. | |
| 2006/0271989 A1 | 11/2006 | Glaser et al. | |

OTHER PUBLICATIONS

Cabena, Peter et al., Intelligent Miner for Data Applications Guide, IBM RedBook SG24-5252-00, Mar. 1999.

Datasage.com News and Events—DataSage Releases netCustomer, the 1$^{st}$ Individualization Solution for E-Commerce, retrieved Feb. 16, 2005 from Archive.org , 3 pgs, Aug. 2, 1999.

Datasage.com—Executive Overview—Retail, Retail Data Mining Executive Overview, retrieved Feb. 16, 2005 from Archive.org, 7 pgs, Dec. 1998.

Gallant, Steve et al., Successful Customer Relationship Management in Financial Applications (Tutorial PM-1), Conference on Knowledge Discovery in Data, ISBN:1-58113-305-7, pp. 165-241, 2000.

Vignette Corporation to Acquire DataSage, Inc., retrieved from Archive.org Feb. 16, 2005, 3 pgs, Jan. 10, 2000.

Chapman, Pete et al., CRISP-DM 1.0—Step-by-step data mining guide, retrieved from www.crisp-dm.org Feb. 17, 2005, pp. 1-78, 2000.

Mozilla User-Agent String Specification obtained from website <httop:www.mozilla.org/build/revised-user-agent-strings.html>, pp. 1-5, Aug. 23, 2007.

Office Action issued in U.S. Appl. No. 10/616,136, mailed Mar. 12, 2007, 9 pgs.

Office Action issued in U.S. Appl. No. 10/616,107, mailed Mar. 21, 2007, 9 pgs.

Office Action issued in U.S. Appl. No. 10/616,408, mailed Jun. 6, 2007, 10 pgs.

Office Action issued in U.S. Appl. No. 10/616,136, mailed Aug. 29, 2007, 11 pgs.

Office Action issued in U.S. Appl. No. 10/616,107, mailed Sep. 11, 2007, 9 pgs.

Office Action issued in U.S. Appl. No. 10/616,408, mailed Dec. 14, 2007, 10 pgs.

Office Action issued in U.S. Appl. No. 10/616,107, mailed Dec. 31, 2007, 9 pgs.

Office Action issued in U.S. Appl. No. 10/616,136, mailed Feb. 15, 2008, 10 pgs.

Office Action issued in U.S. Appl. No. 10/616,408, mailed May 28, 2008, 12 pgs.

Office Action issued in U.S. Appl. No. 10/616,136, mailed Aug. 19, 2008, 10 pgs.

Office Action issued in U.S. Appl. No. 10/616,107, mailed Nov. 12, 2008, 11 pgs.

Steven P. Reiss, "Event-Based Performance Analysis", Department of Computer Science, Brown University, Proceedings of the 11$^{th}$ IEEE International Workshop on Program Comprehension, 2003, 10 pages.

* cited by examiner

SYSTEM AND METHOD OF ASSOCIATING EVENTS WITH REQUESTS

RELATED APPLICATIONS

This application is a continuation of, and claims a benefit of priority under 35 U.S.C. 120 of the filing date of U.S. patent application Ser. No. 10/616,107 by inventors Artz, et al. entitled "System and Method of Associating Events with Requests" filed on Jul. 9, 2003, which in turn claims priority under 35 U.S.C. §119(e) to U.S. Provisional Patent Application No. 60/394,620, entitled "System and Method of Mapping Application Events to Pages" by Artz et al., filed on Jul. 9, 2002, which is hereby fully incorporated by reference herein. This application is related to U.S. patent application Ser. No. 10/616,408, entitled "Method and System for Site Visitor Information" by Artz et al., filed on Jul. 9, 2003 (the "Visitor Information Application"), and Ser. No. 10/616,136, entitled "System and Method for Detecting Gaps in a Data Stream" by Artz et al., filed on Jul. 9, 2003 (the "Gap Detection Application"). The Visitor Information Application and Gap Detection Application are both hereby fully incorporated by reference herein.

FIELD OF THE INVENTION

This invention relates in general to content management, and more particularly to a system and method of associating events to web site requests.

BACKGROUND

Communication of data over computer networks, particularly the Internet, has become an important, if not essential, way for many organizations and individuals to disseminate information. The Internet is a global network connecting millions of computers using a client-server architecture in which any computer connected to the Internet can potentially receive data from and send data to any other computer connected to the Internet. The Internet provides a variety methods in which to communicate data, one of the most ubiquitous of which is the World Wide Web. Other methods for communicating data over the Internet include e-mail, usenet newsgroups, telnet and FTP.

The World Wide Web is a system of Internet servers, typically called "web servers", that support documents formatted according to the hypertext markup language ("HTML"). These documents, known as web pages, are transferred across the Internet according to the Hypertext Transfer Protocol ("HTTP"). Web pages are often organized into web sites that represent a site or location on the world wide web. The web pages within a web site can link to one or more web pages (or files) at the same web site or at other web sites. A user can access web pages using a browser program and can "click on" links in the web pages being viewed to access other web pages. Each time the user clicks on a link, the browser program generates an HTTP request and communicates it to web server hosting the web page. The web server retrieves the requested web page and returns the web page to the browser program. The returned web page can provide a variety of content, including text, graphics, audio and video content.

Because web pages can display content and receive information from users, web sites have become popular for enabling commercial transactions. As web sites become more important to commerce, businesses are increasingly interested in monitoring how users navigate their web sites. One way to do this is to record an analyze all the HTTP requests made by a user to the web site. This is often called "click stream analysis". An entity controlling a web site can review the paths users took through its web site to try to determine if usage patterns exist.

Current click stream analysis systems, however, typically provide very limited information about a user's browsing habits. This is because they only provide a record of HTTP requests, but do not link the requests to specific content in the web page or events occurring in the page such as the presentation of content from an ad server. Thus, while current click stream analysis systems provide information as to how a user navigated a web site, they provide little or no information as to why the user navigated the web site in that manner. In other words, current click stream analysis systems focus only on user behavior but not the content that drives that behavior. Furthermore, current click stream analysis systems do no link events occurring at back-end systems with the page requests of particular users. Therefore, a user's behavior can not be analyzed in terms of a business process.

FIG. 1 illustrates the deficiencies of current click stream analysis systems. In FIG. 1, a client computer 5, through an Internet browser, makes an HTTP request to a web server 10 over the Internet 15. If the requested web page includes dynamic content, the web server 10 can initiate a script, using, for example, the common gateway interface ("CGI") mechanism, to send data to an application server 20 to generate the dynamic content. Application server 20 can generate dynamic HTML content according to a programming language such as C or PERL and return the contents to web server 10. Web server 10 can, in turn, communicate the HTML content back to the client computer 5 as the requested web page.

In current systems, web server 10 can keep a file 25, known as a web log, of HTTP requests. By associating the HTTP request with a user, current click stream analysis systems can analyze a user's path through the web site hosted by web server 10. However, since the web log only records user requests at web server 10, analysis of the web log provides no insight into the events that occurred at application server 20 in response to a particular request. Thus, while click stream analysis may allow for review of the pages requested by a user, it does not provide any knowledge as to the dynamic content actually presented to the user by application server 20.

SUMMARY OF THE INVENTION

Embodiments of the present invention provide a system and method of associating events with HTTP requests to provide robust data for analysis of behavior that eliminate, or at least substantially reduce, the shortcomings of prior art click stream analysis systems and methods. Embodiments of the present invention can associate events with a user's HTTP requests. For example, when a user clicks on a link, this sends a request to a web-server and a file, representing the requested web page, is returned to the user. If the file is the result of dynamic content, the present invention can associate the generation of dynamic content with the request. Embodiments of the present invention can associate any number of predefined events with user requests.

One embodiment of the present invention can include receiving a set of HTTP request data including a request time stamp for each HTTP request in a set of HTTP requests, receiving a set of event data including an event time stamp for each event in a set of events and associating each event from the set of events with a previous HTTP request from the set of HTTP requests based on the event time stamps and request time stamps. Each event can be associated with a previous HTTP request that is closest in time.

Another embodiment of the present invention can include a method that comprises receiving a set of HTTP request data representing one or more HTTP requests associated with one or more users, wherein the set of HTTP request data includes a request user identifier for each of the one or more HTTP requests and a request time stamp for each of the one or more HTTP requests; receiving a set of event data representing one or more events associated with one or more users, wherein the set of event data includes an event user identifier for each of the one or more events and an event time stamp for each of the one or more events; determining a set of HTTP requests associated with a first user from the one or more HTTP requests based on the request user identifiers; determining a set of events associated with the first user form the one or more events based on the event user identifiers; and associating the set of events associated with first user and the set of HTTP requests associated with the first user based on the event time stamp for each of the set of events associated with the first user and the event time stamp for each of the set of HTTP requests associated with the first user.

Another embodiment of the present invention can include computer code that is executable by a computer processor. The computer code can include, for example, instructions to receive a set of HTTP request data including a request time stamp for each HTTP request in a set of HTTP requests, instructions to receive a set of event data including an event time stamp for each event in a set of events; and instructions to associate each event from the set of events with a previous HTTP request from the set of HTTP requests based on the event time stamps and request time stamps, wherein each event is associated with a previous HTTP request that is closest in time.

Yet another embodiment of the present invention can include instructions to receive a set of HTTP request data representing one or more HTTP requests associated with one or more users, wherein the set of HTTP request data includes a request user identifier for each of the one or more HTTP requests and a request time stamp for each of the one or more HTTP requests, instructions to receive a set of event data representing one or more events associated with one or more users, wherein the set of event data includes an event user identifier for each of the one or more events and an event time stamp for each of the one or more events, instructions to determine a set of HTTP requests associated with a first user from the one or more HTTP requests based on the request user identifiers, instructions to determine a set of events associated with the first user form the one or more events based on the event user identifiers, and instructions to associate the set of events associated with first user and the set of HTTP requests associated with the first user based on the event time stamp for each of the set of events associated with the first user and the event time stamp for each of the set of HTTP requests associated with the first user.

Embodiments of the present invention provide an advantage over prior art systems and methods by associating events with HTTP requests. This allows browsing behavior to be linked to application and business behavior.

Embodiment of the present invention provide another advantage by providing a more powerful data for further analysis that can focus on content or business context, not just user behavior.

BRIEF DESCRIPTION OF THE FIGURES

A more complete understanding of the present invention and the advantages thereof may be acquired by referring to the following description, taken in conjunction with the accompanying drawings in which like reference numbers indicate like features and wherein.

DETAILED DESCRIPTION

Preferred embodiments of the invention are illustrated in the FIGURES, like numerals being used to refer to like and corresponding parts of the various drawings. Embodiments of the present invention provide a system and method for associating events occurring at a web page with a user's HTTP request. When a user makes an HTTP request (e.g., by clicking on a link), embodiments of the present invention can record the request and the time of the request. If the requested file (e.g., web page) is the result of dynamic content, such as .jsp, asp, or .pl script, the present invention can log the events that generated the content or other application events. The application events can include, for example, the generation of the content to which the user is exposed, campaigns to which the user is exposed or other content that is displayed to the user. Additionally, other application events such as backend business events (e.g., when items are added and removed from a shopping cart, purchases made, requests made for new services, such as loan applications, requests for telecommunication provisioning, user registration and other business events) can be logged.

Embodiments of the present invention can associate requests for a web page with various events including application events. In one embodiment of the present invention, this can be done by time ordering all of the page requests and the application (and/or other) events. Since the page requests initiates the script that produces the application events, the time of the page request will be before the associated application events. Thus, all application events can be associated with the closest preceding page request.

Figure 1:
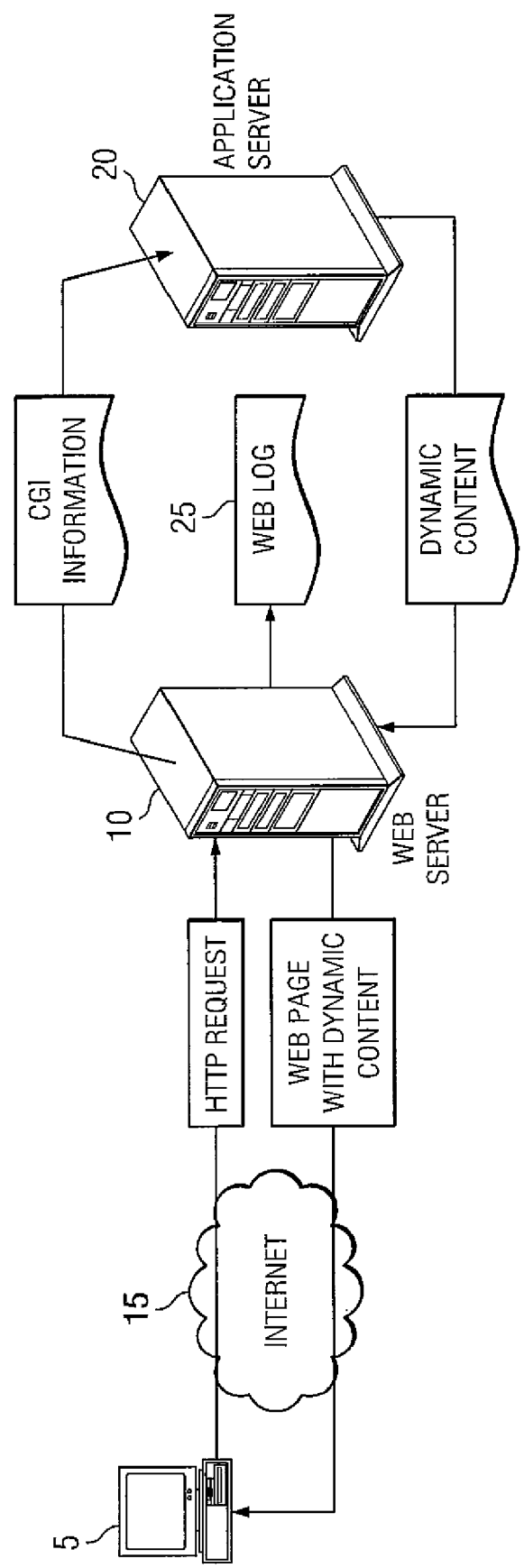
FIG. 1 is a diagrammatic representation of a conventional system of logging user behavior at a dynamic web site.
Figure 2:
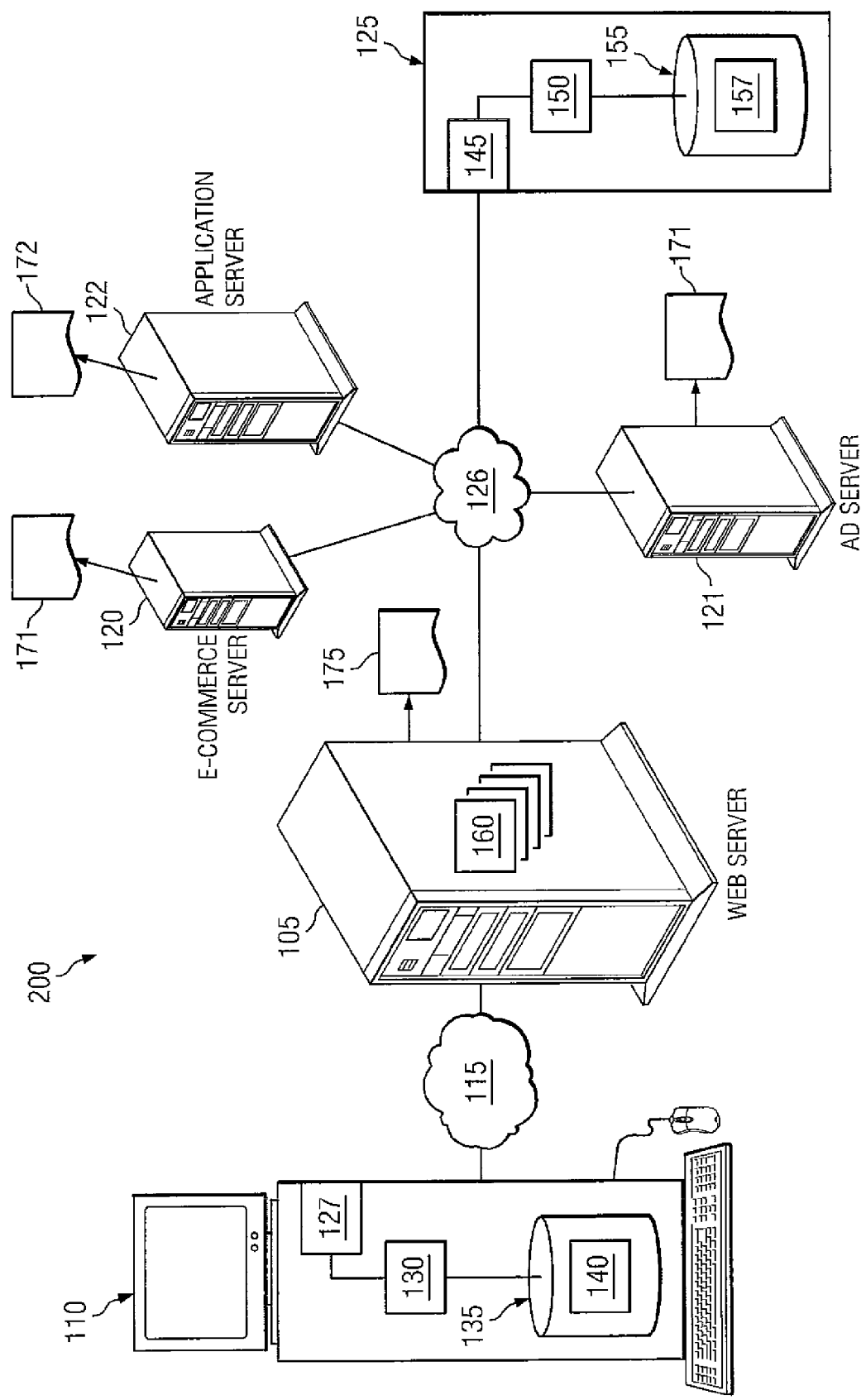
FIG. 2 is a diagrammatic representation of a system for associating a user's HTTP requests with events occurring at various systems.

FIG. 2 is a diagrammatic representation of a system 100 for associating application events and or other events to page requests. In FIG. 2, a web server 105 connects to a client computer 110 via network 115, which can be a global computer network such as the Internet, a local area network ("LAN"), a wide area network ("WAN"), a wireless network or any computer network known in the art. Web server 105 can also connect to additional servers, such as, for example, e-commerce server 120, ad server 121, an application server 122 and a management system 125 via, for example, a second network (e.g., a LAN) 126. Client computer 110 can include a network interface 127 (e.g., an internal or external modem, Ethernet adapter or other network interface device known in the art) to connect to and interface with network 115, a CPU 130 and a computer readable storage medium 135 (e.g., RAM, ROM, optical storage medium, magnetic storage medium or any other computer readable memory known in the art). Additionally, client computer 110 can include one or more input devices (e.g., keyboard, mouse, voice activated input or other input device known in the art) and one or more displays. Computer readable storage medium 135 can store a browser program 140 that can be executable by CPU 130 to allow a user, through the use of the input and display devices, to request and view web pages over network 115. Examples of browser programs include Netscape Navigator™, (Netscape and Netscape Navigator are trademarks of Netscape Communications Corporation of Mountain View, Calif.) and Microsoft Internet Explorer™ (Microsoft and Microsoft Internet Explorer are trademarks of Redmond, Wash. based Microsoft Corporation).

Likewise, management system 125 can include a network interface 145 (e.g., an internal or external modem, Ethernet adapter or other network interface device known in the art) to connect to and interface with network 126, a CPU 150 and a computer readable storage medium 155 (e.g., RAM, ROM, optical storage medium, magnetic storage medium or any other computer readable memory known in the art). Computer readable storage medium 155 can store computer instructions 157 executable by CPU 150 to associate requests for web pages with various application events and other events. In one embodiment of the present invention, this can be done, by time ordering all of the page requests and the events and associating each event for a user with the previous HTTP request that is closest in time. The computer instructions, in an embodiment of the present invention, may be contained on any data storage device, such as a hard drive. A computer instruction component (e.g., software, hardware, firmware) for carrying out the methods described herein can comprise a combination of software code elements that are embodied within a data processing system readable medium. Alternatively, the instructions may be stored as software code elements on a DASD array, magnetic tape, floppy diskette, optical storage device, RAM or other appropriate computer readable medium. Although not shown for clarity, each of web server 105, e-commerce server 120, ad server 121 and application server 122 can include computer components such as network interfaces, memories, processors and other computer components and software known in the art. Web server 105 can host a web site 160, that can comprise one or more web pages.

In operation, browser program 140 can generate a request, such as an HTTP GET request for a web page hosted by web server 105. In other words, browser program 140 can request a web page from web site 160. Web server 105 can retrieve the web page and communicate the web page to browser 140 for review by a user. Included in the web page can be text, graphics, audio content and video content. Additionally, the web server can initiate scripts to insert dynamic content into the web page or carry out back end business processes. For example, if dynamic content is included in the requested web page, web server 105 can execute a common gateway interface ("CGI") to send information to application server 122 to generate the content (e.g., according to jsp, asp, or .pl script). Application server 122 will generate the content and send the content back to web server 105. Web server 105 can then serve the requested web page.

As a user browses web site 160 by requesting additional pages, web server 105 can initiate other events at e-commerce server 120, ad server 121, and application server 122. For example, if web site 160 is a commercial web site offering products for sale, e-commerce server 122 may update the state of a shopping cart based on information provided by a user. Or, ad server 121 can dynamically generate advertisements for insertion into the content of a requested web page. The initiation of various events, including the generation of dynamic content according to various scripts (e.g., .jsp, asp, .pl, or other script known in the art), and backend business processes based on HTTP requests would be understood by those of ordinary skill in the art as being common activities in enterprise and commercial web pages.

Each system affected by a user's browsing can log predefined events. For example, e-commerce server 120 can log each time the state of a user's shopping cart changes, ad server 121 can log each time a dynamic advertisement is generated, and application server 122 can log each time application server 122 generates other dynamic content. Additional systems, such as inventory and shipping systems, can also create logs of activities initiated in response to a user's browsing behavior. As would be understood by those of ordinary skill in the art, any number of events can be triggered by actions taken by a user when browsing a web site. These events can occur internal to the enterprise of the entity running web server 105 or can occur at a third party application service provider, such as a merchant processing service.

Each of e-commerce server 120, ad server 121 and application server 122 can create a log file for events occurring at that server (log files 170, 171, and 172, respectively). Additionally, web server 105 can create a web log 175 of HTTP requests according to a user identification and time stamp. It should be noted that there are several types of HTTP requests known in the art, including GET, POST, PUT, HEAD, DELETE, OPTIONS and TRACE. Web server 105 can be programmed to only log particular types of HTTP requests, such as GET or POST, or can log all HTTP requests. E-commerce server 120, ad sever 121 and application server 122 can also log predefined events occurring at those systems according to a user identification and time stamp.

Conventional click stream analysis systems typically analyze only the browsing behavior of the user(s) (i.e., the log file created by the web server). While this may give insight into the path a user followed through a web site, it typically provides no insight into what dynamic content was seen by the user or which backend business processes were affected by the user's browsing. Embodiments of the present invention, on the other hand, can associate events such as the generation of dynamic content according to various scripts (e.g., .jsp, .asp, .pl, or other script known in the art) or backend business events with a user's browsing behavior. This can allow for a greater depth of analysis than provided by click stream analysis systems.

According to one embodiment of the present invention, management system 125 can receive the log files (or the data therein) from each of web server 105, e-commerce server 120, ad server 121 and application server 122 and time order the HTTP requests and events. In the preferred embodiment of the present invention, each system providing data on HTTP requests or events is time synchronized to ensure that HTTP requests and events are properly time ordered. Additionally, in the preferred embodiment of the present invention each uses a common user identification to identify a particular user. One method of assigning user identifiers is described in the Visitor Information Application, which is hereby fully incorporated by reference. In another embodiment of the present invention, however, management system 125 can map the user identifications from various other systems to a common user identification.

It should be noted that preprocessing can occur between the systems providing the data (e.g., web server 105, e-commerce server 120, ad server 121 and application server 122) and management system 125. The preprocessing can include associating particular requests with sessions, parsing the request and event logs to remove particular events and requests from the logs and gap detection to ensure that gaps in the data do not exists. One method for performing gap detection is described in the Gap Detection Application, which is fully incorporated by reference herein.

Management system 125 can receive the HTTP request data and event data from the various systems and associate events with particular HTTP requests. In one embodiment of the present invention, this can be done by associating each event for a particular user with the HTTP requests generated by that user that is previous to and closest in time to the event. In other words, each HTTP request for user can be associated with the events for the same user that immediately follow the HTTP request based on the time stamps provided by the various systems.

Figure 3:
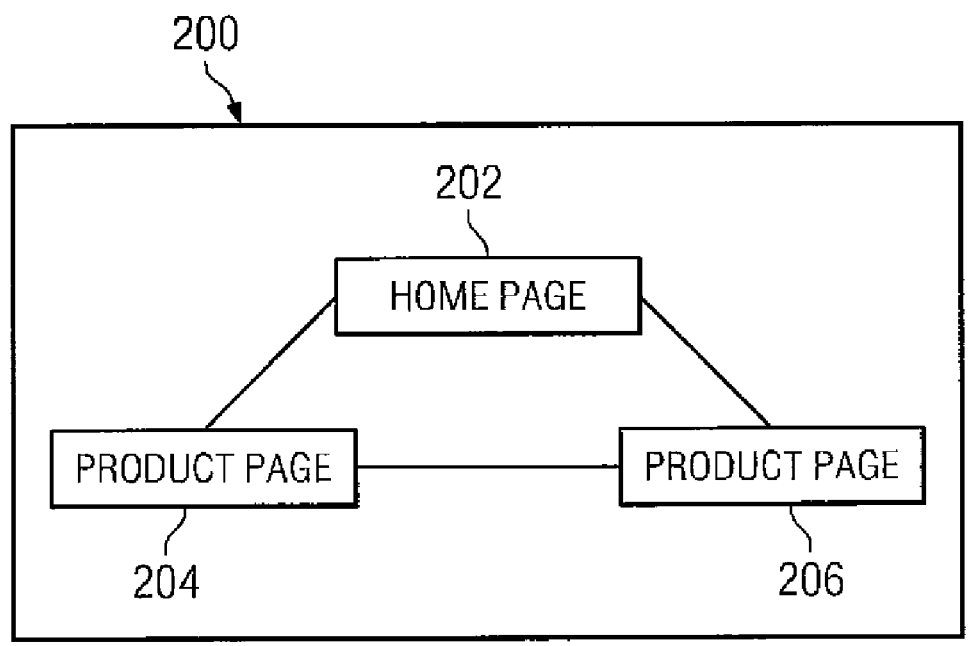
FIG. 3 is a diagrammatic representation of a web site for which HTTP requests can be associated with events.

FIG. 3 is a diagrammatic representation of a web site 200 for which events, including application events can be associated with HTTP requests. Web site 200 can include three web pages (page 202, page 204 and page 206). Each page can display static content (i.e., content that does not typically change from instance to instance of the particular web page) and dynamic content (i.e., content that can change for given instances of web page depending on a variety of algorithms). Each time a page from web site 200 is requested, dynamic content or dynamic advertisements can optionally be generated. Additionally, each visitor to web site 200 can be provisioned with a shopping cart that can change states. For the sake of simplicity, only three events will be defined: the generation of dynamic content ("DynCont") at an application server, a state change in a user's shopping cart (e.g., a shopping cart event) and the generation of a dynamic advertisement ("DynAd") at an ad server. Any number of other events can also be defined. Additionally, for the sake of simplicity, only HTTP GET requests are logged.

Assume that three users, User A, User B and User C browse web site 200 at roughly the same time, user A can request page 202, page 204, page 206 and page 202 again; user B can request page 202, page 206 and page 202; and user C can request page 206 and then page 202. When user A visits page 202, an ad server can generate dynamic content for inclusion in the content of page 202. Before proceeding to page 204, user A can change the state of his or her shopping cart, which can be logged at an e-commerce server. As user A browses web site 200, additional events can be triggered. Tables 1, 2 and 3, below, illustrate example tables that can be maintained by the web server hosting web site 200, an applications server generating dynamic content, an ad server generating dynamic advertisements and an e-commerce server tracking changes in shopping cart states. These tables represent the logged requests and events for example users A, B and C. It should be noted that these tables are provided by way of example only and are not limiting of the present invention.

Table 1 illustrates an example web log that can be generated by the web server hosting web page 200. Additional information can be included in the web log and the address can include the address of the page requested, the logical address of the page requested and/or other web page address known in the art.

TABLE 1

| User | Time | Request Type | Address |
|---|---|---|---|
| A | 12:15:05 | HTTP GET | address |
| A | 12:15:40 | HTTP GET | address |
| B | 12:16:05 | HTTP GET | address |
| A | 12:16:15 | HTTP GET | address |
| C | 12:17:10 | HTTP GET | address |
| A | 12:20:23 | HTTP GET | address |
| B | 12:22:05 | HTTP GET | address |

TABLE 1-continued

| User | Time | Request Type | Address |
|---|---|---|---|
| C | 12:23:17 | HTTP GET | address |
| B | 12:25:42 | HTTP GET | address |

Table 2 illustrates an example log that can be maintained by an application server that can add dynamic content to requested pages.

TABLE 2

| User | Time | Event Type | Additional Information |
|---|---|---|---|
| A | 12:15:06 | DynCont | information about content generated |
| C | 12:17:11 | DynCont | information about content generated |
| C | 12:24:06 | DynCont | information about content generated |

Table 3 illustrates an example log that can be maintained by an e-commerce server that can track the change in states of the shopping carts for multiple users.

TABLE 3

| User | Time | Event Type | Additional Information |
|---|---|---|---|
| A | 12:15:38 | shopping cart event | State Change |
| A | 12:16:14 | shopping cart event | State Change |
| A | 12:17:32 | shopping cart event | State Change |
| B | 12:18:31 | shopping cart event | State Change |
| A | 12:19:14 | shopping cart event | State Change |
| C | 12:20:02 | shopping cart event | State Change |
| A | 12:22:09 | shopping cart event | State Change |

Table 4 illustrates an example log that can be maintained by an ad server that can track dynamic ads generated for insertion into the web pages of web site 200.

TABLE 4

| User | Time | Event Type | Additional Information |
|---|---|---|---|
| A | 12:16:00 | DynAd | Dynamic Ad |
| A | 12:16:06 | DynAd | Dynamic Ad |
| B | 12:16:07 | DynAd | Dynamic Ad |
| A | 12:16:16 | DynAd | Dynamic Ad |
| A | 12:20:24 | DynAd | Dynamic Ad |
| B | 12:22:06 | DynAd | Dynamic Ad |
| C | 12:24:07 | DynAd | Dynamic Ad |

Figure 4:
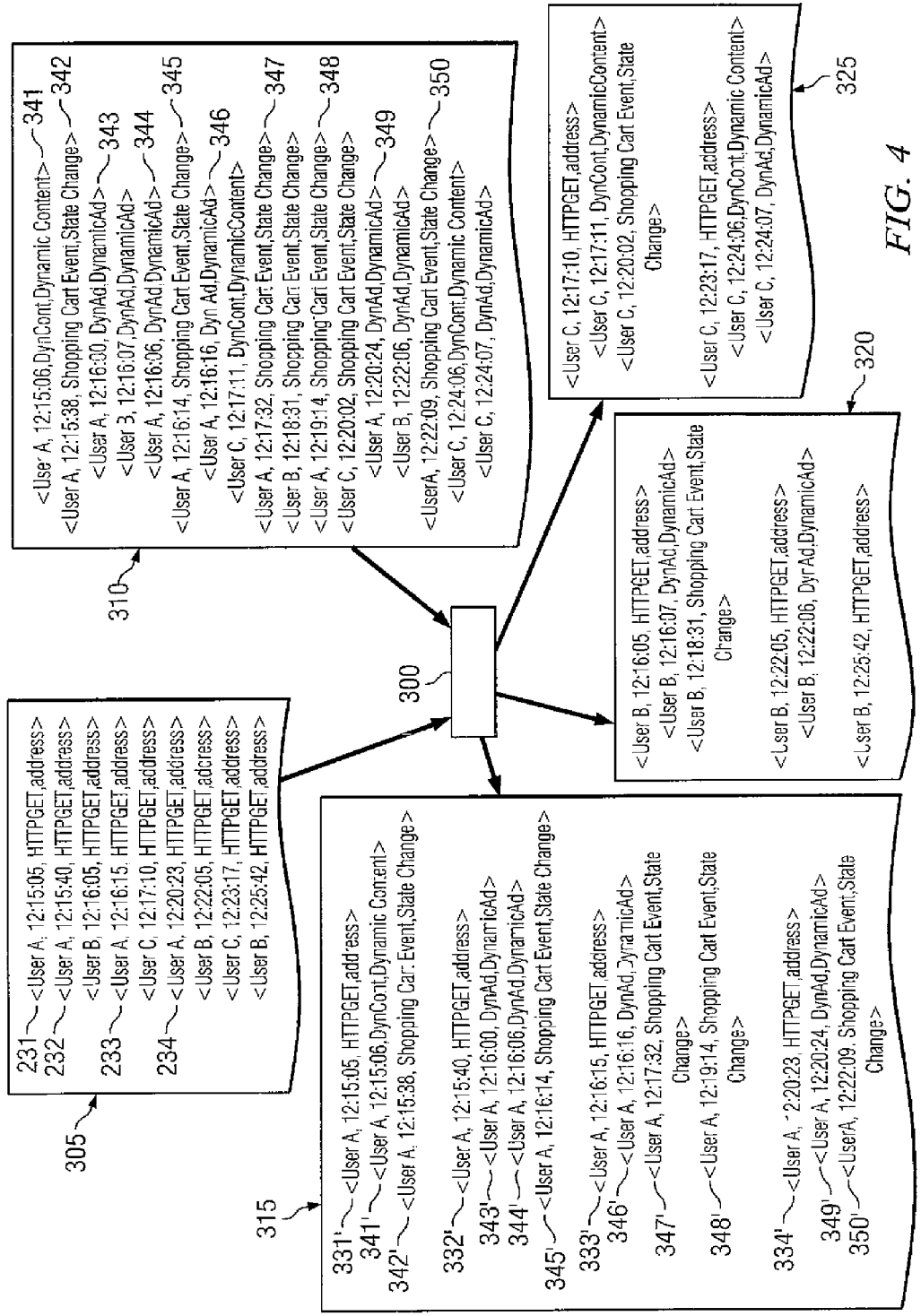
FIG. 4 is a diagrammatic representation of associating HTTP requests with events.

The data in these tables can be associated together as described in conjunction with FIG. 4.

FIG. 4 is a diagrammatic representation of associating HTTP requests and events for Users A, B, and C, according to one embodiment of the present invention. A management system 300 can receive a set of HTTP request data 305 and a set of event data 310. The HTTP request data 305 and event data 310 can be received from any number of systems such as web server, application servers, e-commerce servers, third party merchant provisioning systems or any other system capable of logging events. Thus, while shown as single streams of data in FIG. 3, request data 305 and event data 310 can be received as multiple files, be drawn from multiple database tables or be received in any other manner known in the art. The HTTP request data 305 and the event data 310 can be received in real time or can be received in batches according to a predefined schedule.

For each HTTP request, HTTP request data 305 can include a visitor identification, a time stamp and a string indicating the HTTP request made or logical page corresponding to the HTTP request. Additional information in HTTP request data 305 can include, but is not limited to, a request type and a channel ID. For each event, the set of event data 310 can include a visitor identification, a time stamp and an event type. Additional information can include, but is not limited to, a channel ID and string information describing the event. The event data 310 can include data for events generated from a variety of processes and can include event data corresponding to application events such as the execution of .jsp, .asp, or .pl scripts or backend business events generated by, for example, shipping and inventory systems.

Management system 300 can time order the HTTP request data and event data according to each user. For example, if HTTP request data 305 and event data 310 includes HTTP request data and event data for three users, user A, user B and user C, management system can generate association 315 for user A, association 320 for user B and association 325 for user C. In essence, management system 300 associates each event corresponding to a particular user with the previous HTTP request that is the closest in time to the event.

The events in the set of event data 310 can include any event that can be logged in response to a user's browsing including application events such as, for example, the generation of dynamic content, changes in shopping cart states or revenue generation. In the example of FIG. 4, three event types are defined: the generation of dynamic content at an application server, a state change in a user's shopping cart and the generation of a dynamic advertisement at an ad server. Any number of other events can also be defined.

Embodiments of the present invention can associate a user's browsing behavior with events, such as the generation of dynamic content, by associating each event for a user with the previous HTTP request (GET, HEAD, POST or other HTTP request known in the art) from the user that is closest in time. User A in FIG. 3, for example, made four HTTP GET requests to web site 200 (labeled 331-334 in the set of HTTP request data 305 and correspondingly 331'-334' in association 315). Additionally, ten events were logged for user A (labeled 341-350 in the set of event data 305 and correspondingly 341'-350' in association 315). Each of the ten events is associated with an HTTP request by associating each event with the HTTP request that is closest in time and previous to the particular event. Thus, for example, event 341, which occurred at 12:15:06 can be associated with the previous HTTP request that occurred at 12:15:05 (i.e., request 331). Association 315 provides information on not only which web pages user A visited, but also what events occurred. For example, it can be seen from association 315 that after user A made request 331, dynamic content was generated for the requested web page (event 341) and that state of user A's shopping cart subsequently changed (event 342). This can allow for a much richer analysis of behavior than traditional click stream analysis systems because the behavior of backend and application systems can be associated with user behavior at a web site.

It should be noted that the associations for users can include additional organizational elements such as sessions. Sessions can be determined by a session ID included with the HTTP request data and event data or by the fact that the management system receives the HTTP request data and event data within a certain time period or any other suitable manner. It should be further noted that while shown as single entities in FIG. 4, the management system can store the data to build the associations across multiple database tables and can contain the logic to build the associations.

For example, according to one embodiment of the present invention, the management system can maintain an HTTP request table, an event table and an unknown event table or dump table. Computer instructions can be executed by a processor to read the data in tables and associate events with HTTP requests. Table 5 illustrates one embodiment of an HTTP request table that includes a request type, a user identification for each request, a time stamp for each request and include name value pairs or data strings providing additional data regarding the corresponding request. Table 5 is provided by way of example only.

TABLE 5

| Request Type | User | Time | Name:Val |
|---|---|---|---|
| HTTP GET | A | 12:15:05 | Name:Val |
| HTTP GET | A | 12:15:40 | Name:Val |
| HTTP GET | B | 12:16:05 | Name:Val |
| HTTP GET | A | 12:16:15 | Name:Val |
| HTTP GET | C | 12:17:10 | Name:Val |
| HTTP GET | A | 12:20:23 | Name:Val |
| HTTP GET | B | 12:22:05 | Name:Val |
| HTTP GET | C | 12:23:17 | Name:Val |
| HTTP GET | B | 12:25:42 | Name:Val |

The Name-Value pairs of Table 5 can be used to specify additional information about a request or point to other databases that contain additional information. The HTTP Request table can include additional data such as channel IDs or any other defined information for a particular implementation.

Table 6 illustrates one embodiment of an event table that includes time ordered events. Table 6 is provided by way of example only.

| Event Type | User | Time | Name:Val |
|---|---|---|---|
| DynCont | A | 12:15:06 | nam:val |
| shopping cart event | A | 12:15:38 | nam:val |
| DynAd | A | 12:16:00 | nam:val |
| DynAd | A | 12:16:06 | nam:val |
| DynAd | B | 12:16:07 | nam:val |
| shopping cart event | A | 12:16:14 | nam:val |
| DynAd | A | 12:16:16 | nam:val |
| DynCont | C | 12:17:11 | nam:val |
| shopping cart event | A | 12:17:32 | nam:val |
| shopping cart event | B | 12:18:31 | nam:val |
| shopping cart event | A | 12:19:14 | nam:val |
| shopping cart event | C | 12:20:02 | nam:val |
| DynAd | A | 12:20:24 | nam:val |
| DynAd | B | 12:22:06 | nam:val |
| shopping cart event | A | 12:22:09 | nam:val |
| DynCont | C | 12:24:06 | nam:val |
| DynAd | C | 12:24:07 | nam:val |

Table 6 includes a time ordered list of all the logged events for which an event type is known. In essence, Table 6 time orders the events of Tables 2-4.

Embodiments of the present invention can also include a dump table for each event for which the event type is not known. By using the unknown type table, unknown event types can be associated with an HTTP request so long as the user for the event is known and the event time stamped.

Tables 5 and 6 contain data for each of user A, B, and C.

It should be understood however that, in other embodiments of the present invention, separate tables can be maintained for each user and that the data can be stored in any suitable data storage format known in the art, such as database entries or indexed files.

Figure 5:
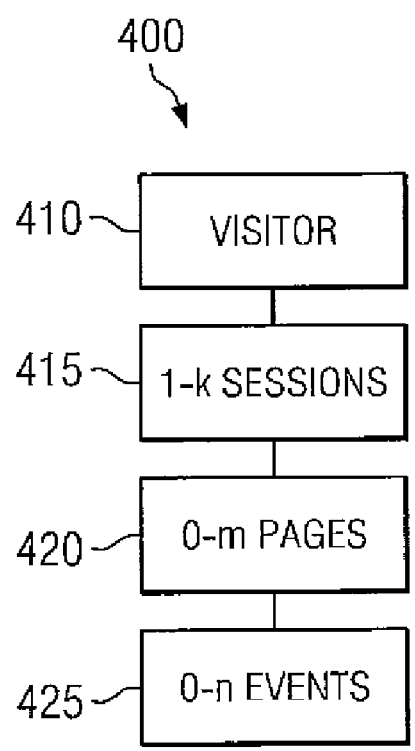
FIG. 5 is a diagrammatic representation of an object model.

FIG. 5 is a diagrammatic representation of one embodiment of a generic object model 400 for associating events with HTTP requests. An instance of the object model can be built based on the received event data and HTTP request data. Each user visiting a web site (represented by visitor block 405) can have 1 to k sessions (block 410). A visitor can include a human user, a programmatic user (e.g., a web browser), a token based user or other user of a web page known in the art. 0 to m web pages (block 415) can be associated with each session and 0 to n events (block 420) can be associated with each page. If the object model 400 includes sessions, HTTP request data and event data can be provided to the management system on a session basis or the HTTP request data and event data, for each HTTP request or event can include a session ID. Sessions can be established according to any method of sessionizing known in the art.

Figure 6:
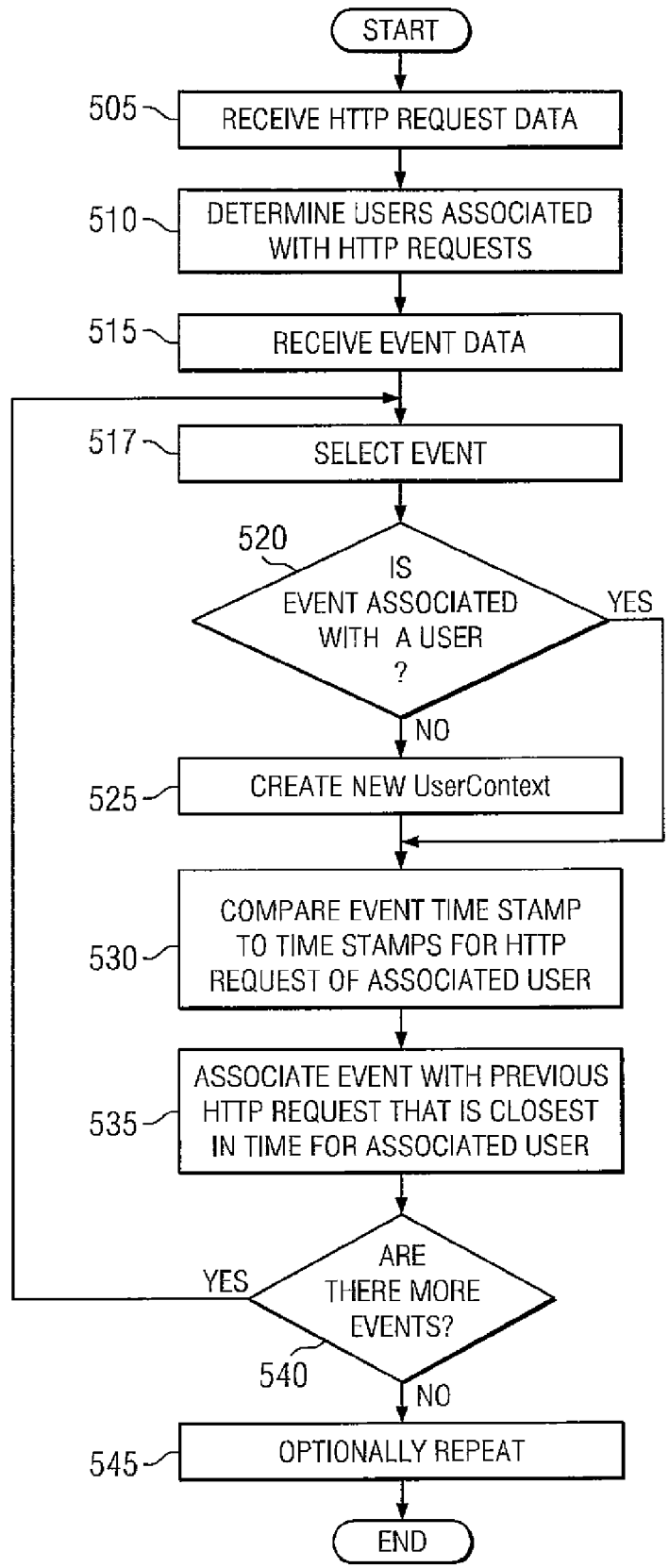
FIG. 6 is a flow diagram illustrating a method for associating requests with events.

FIG. 6 illustrates one embodiment of a method for associating events with HTTP requests according to one embodiment of the present invention. In one embodiment of the present invention, the method of FIG. 6 can be implemented by computer instructions stored on one or more computer readable mediums that are executable by one or more computer processors. At step 505, a management system can receive a set of HTTP request data that, in one embodiment of the present invention, can include, a user identifier and a request time stamp for each HTTP request. At step 510, the management system can determine the users associated with the HTTP requests.

The management system, at step 515 can receive a set of event data that contains a user identifier and event time stamp for each event. The event data can represent on or more events that can be logged based on a user's browsing activity. These events can include application events such as the generation of dynamic content according to .jsp, .asp, .pl or other scripts known in the art or backend business events such as inventory control events. At step 517, the management system can select a particular event and at step 520, the management system can determine if a particular event corresponds to a user associated with an HTTP request. If not, the management system can create the appropriate user context on the fly (step 525), associate the event with the user and continue processing. Thus, at step 525, the management system can create the user context and proceed to step 530. Creating the user context can include, for example, creating a new session for the user associated with the event.

If, on the other hand, the event does correspond to a known user, as determined at step 520, the management system can, at step 530, compare the event time stamp for the event to the request time stamps for the HTTP requests corresponding the associated user. At step 535, the management system can associate the event with the HTTP request that is previous to and closest in time to the event for the associated user. At step 540, the management system can determine if there are any remaining events and, if so, can return to step 517 and select the next event. Management system 540 can optionally repeat steps 505-540 (step 545).

Although described as a separate unit in the embodiment of FIG. 2, the management system can be implemented at various spots including at any existing server such as a web server, e-commerce server or application server and can use shared components such as processors, network interfaces and memories. Embodiments of the present invention provide advantages over prior art systems by allowing application and other events to be associated with web page requests. This can allow a user's browsing behavior to be linked to backend application behavior, providing a more robust content for analysis that focuses on content and business processes, not just web site behavior.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed in the following claims.

What is claimed is:

1. A method of associating requests and events, comprising:
    at a web server computer, receiving a plurality of Hypertext Transfer Protocol (HTTP) requests from user computers connected to the web server computer over a first network;
    in response to said receiving the plurality of the HTTP requests, initiating, by the web server computer, events at server computers connected to the web server computer over a second network;
    logging HTTP requests data at the web server computer;
    logging events data at the server computers;
    receiving the HTTP requests data from the web server computer and the events data from said server computers at a management system residing in the second network, wherein the HTTP requests data comprises a user identification for each of the plurality of HTTP requests and a time stamp for each of the plurality of the HTTP requests, and wherein the events data comprises a user identification for each of the events and a time stamp for each of the events; and
    for each user identified in the plurality of the HTTP requests and the events, generating an association associating each of the events performed in the second network for the each user with a previous HTTP request of the plurality of the HTTP requests received from the each user over the first network that is the closest in time to the each of the events.

2. The method of claim 1, further comprising:
    at the management system, time ordering the plurality of the HTTP requests and the events using said time stamp for each of the plurality of the HTTP requests and the time stamp for each of the events;
    wherein said generating the association comprises said generating the association associating each of the events performed in the second network for the each user with the previous HTTP request of the plurality of the HTTP requests received from the each user over the first network that is the closest in time to the each of the events according to the time ordering.

3. The method of claim 1, wherein the first network and the second network are the same.

4. The method of clam 1, further comprising:
    time synchronizing the web server computer with the server computers, wherein said time synchronizing operates to time synchronize the plurality of HTTP requests at the web server computer with the events at the server computers.

5. The method of claim 1, further comprising:
preprocessing one or more of the HTTP requests data or the events data prior to said receiving the HTTP requests data and the events data at the management system;
wherein said preprocessing operates to perform one or more of:
associating one or more of the plurality of the HTTP requests with sessions;
parsing one or more of the HTTP requests data and the events data to remove one or more of one or more requests from the HTTP requests data or one or more events from the events data; or
perform gap detection to eliminate any gaps in the one or more of the HTTP requests data or the events data.

6. The method of claim 1, wherein the user identification for each of the plurality of HTTP requests the user identification for each of the events use a common user identification.

7. The method of claim 1, prior to said generating the association, determining whether there is a user for each of the events that corresponds to each of the HTTP requests; and
generating user context for each of the events without a corresponding user.

8. The method of claim 1, wherein the management system is comprised in one or more of the web server computer or the server computers.

9. The method of claim 1, wherein said initiating events at said server computers comprises initiating one or more scripts to insert dynamic content into a web page or to carry out one or more back end business processes.

10. The method of claim 1, wherein said initiating events at said server computers comprises initiating generation of at least one dynamic advertisement.

11. A computer program product comprising at least one non-transitory computer readable storage medium storing computer instructions executable by a processor to:
receive HTTP requests data from a web server computer and receive events data from one or more server computers at a management system, wherein the web server computer is coupled to one or more user computers and wherein the one or more server computers are coupled to the web server computer; and
for each user in the HTTP requests data and the events data, generate at the management system an association associating each event for the each user with a HTTP request received from the each user that is the closest in time to the event.

12. The computer program product of claim 11, wherein the computer instructions are further executable by a processor to:
time order the HTTP requests data and the events data at the management system to generate time ordered HTTP request data and time ordered events data;
wherein said generating at the management system the association associating each event comprises using the time ordered HTTP request data and the time ordered events data to said generate the association.

13. The computer program product of claim 11, wherein in response to said receiving the plurality of the HTTP requests, the web server computer is operable to initiate events at server computers connected to the web server computer;
wherein said initiating events at said server computers comprises initiating one or more scripts to insert dynamic content into a web page or to carry out one or more back end business processes.

14. The computer program product of claim 11, wherein the computer instructions are further executable by a processor to:
prior to said generating the association, determine whether there is a user for each of the events that corresponds to each of the HTTP requests; and
generate user context for each of the events without a corresponding user.

15. The computer program product of claim 11, wherein the management system is comprised in one or more of the web server computer or the server computers.

16. A system for associating requests and events, comprising:
a web server computer connected to a plurality of user computers for receiving one or more Hypertext Transfer Protocol (HTTP) requests from the plurality of user computers, wherein the web server computer is operable to log the received one or more HTTP requests;
one or more server computers connected to the web server computer, wherein the one or more server computers are operable to log one or more events; and
a management system operable to:
receive HTTP requests data from the web server computer and receive events data from the one or more server computers, wherein the HTTP requests data comprises a user identification for each of the one or more HTTP requests and a time stamp for each of the one or more HTTP requests and wherein the events data comprises a user identification for each of the one or more events and a time stamp for each of the one or more events; and
for each user identified in the HTTP requests data and the events data, generate an association associating each of the events for the each user with a previous HTTP request of the HTTP requests received from the each user that is the closest in time to the each of said events.

17. The system of claim 16, wherein the management system is further operable to:
time order the HTTP requests data and said events data using said time stamp for each of one or more HTTP requests and said time stamp for each of the one or more events;
wherein said generating the association comprises said generating the association associating each of the events for the each user with the previous HTTP request of the plurality of the HTTP requests received from the each user that is the closest in time to the each of the events according to the time ordering.

18. The system of claim 16, wherein, in response to receiving the one or more HTTP requests, the web server computer is operable to initiate the one or more events at the one or more server computers.

19. The system of claim 16, wherein said initiating events at the server computers comprises initiating one or more scripts to insert dynamic content into a web page or to carry out one or more back end business processes.

20. The system of claim 16, wherein the management system is further operable to:
prior to said generating the association, determine whether there is a user for each of the events that corresponds to each of the HTTP requests; and
generate user context for each of the events without a corresponding user.

* * * * *